(12) United States Patent
Anand et al.

(10) Patent No.: US 8,271,989 B2
(45) Date of Patent: Sep. 18, 2012

(54) METHOD AND APPARATUS FOR VIRTUAL PROCESSOR DISPATCHING TO A PARTITION BASED ON SHARED MEMORY PAGES

(75) Inventors: Vaijayanthimala K. Anand, Austin, TX (US); Peter J. Heyrman, Rochester, MN (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1260 days.

(21) Appl. No.: 12/027,525

(22) Filed: Feb. 7, 2008

(65) Prior Publication Data

US 2009/0204959 A1 Aug. 13, 2009

(51) Int. Cl.
*G06F 9/455* (2006.01)
*G06F 9/46* (2006.01)
(52) U.S. Cl. ............... 718/104; 718/1; 718/100
(58) Field of Classification Search .............. 718/1, 100, 718/104
See application file for complete search history.

(56) References Cited

U.S. PATENT DOCUMENTS

| | | | | |
|---|---|---|---|---|
| 5,128,871 | A * | 7/1992 | Schmitz | 716/102 |
| 5,319,760 | A * | 6/1994 | Mason et al. | 711/208 |
| 6,182,089 | B1 | 1/2001 | Ganapathy et al. | |
| 6,381,682 | B2 * | 4/2002 | Noel et al. | 711/153 |
| 6,820,263 | B1 * | 11/2004 | Klappholz | 718/108 |
| 7,206,915 | B2 | 4/2007 | Desouter et al. | |
| 7,500,048 | B1 * | 3/2009 | Venkitachalam et al. | 711/6 |
| 2005/0108496 | A1 | 5/2005 | Elnozahy et al. | |
| 2006/0190697 | A1 | 8/2006 | Grant | |
| 2006/0277307 | A1 * | 12/2006 | Bernardin et al. | 709/226 |
| 2006/0288187 | A1 | 12/2006 | Burugula et al. | |
| 2007/0271563 | A1 * | 11/2007 | Anand et al. | 718/100 |
| 2009/0113428 | A1 * | 4/2009 | Huff et al. | 718/100 |

OTHER PUBLICATIONS

Luke Browning, IBM EServer p5 AIX 5L Support for Micro-Partitioning and Simultaneous Multi-threading White Paper, Jul. 13, 2004, U.S.

* cited by examiner

*Primary Examiner* — Chun Cao
*Assistant Examiner* — Samantha Hoang
(74) *Attorney, Agent, or Firm* — Robert C. Rolnik; David A. Mims

(57) ABSTRACT

The present invention provides a computer implemented method, data processing system, and computer program product for mapping and dispatching virtual processors in a data processing system having at least a first partition and a second partition. The data processing system runs a first partition on a virtual processor during a first timeslice. The data processing system identifies an at least one physical page used by the first partition and the second partition. The data processing system maps the at least one physical page to the first partition and the second partition. The data processing system determines a fitness value based on the mapping. The data processing system dispatches the Virtual processor to the second partition on a second timeslice based on the fitness value, wherein the second timeslice immediately succeeds after the first timeslice, whereby the at least one physical page remains in cache during at least the first timeslice and the second timeslice.

20 Claims, 6 Drawing Sheets

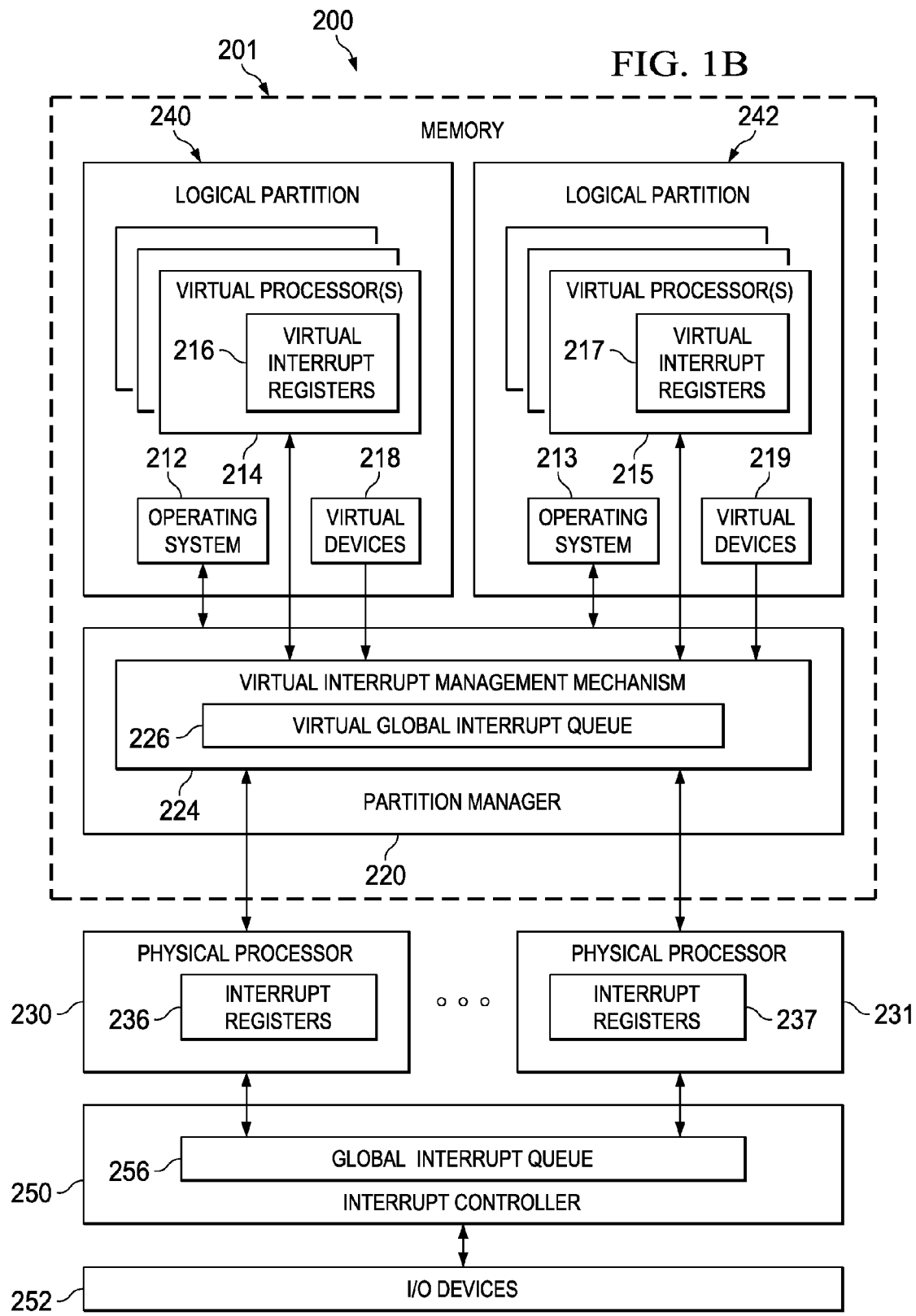

| CACHE AFFINITY MATRIX | | | | |
|---|---|---|---|---|
|  | PARTITION A | PARTITION B | PARTITION C | PARTITION E |
| PARTITION A |  | 60 | 3 | 1 |
| PARTITION B | 60 |  | 17 | 2 |
| PARTITION C | 3 | 17 |  | 5 |
| PARTITION E | 1 | 2 | 5 |  |

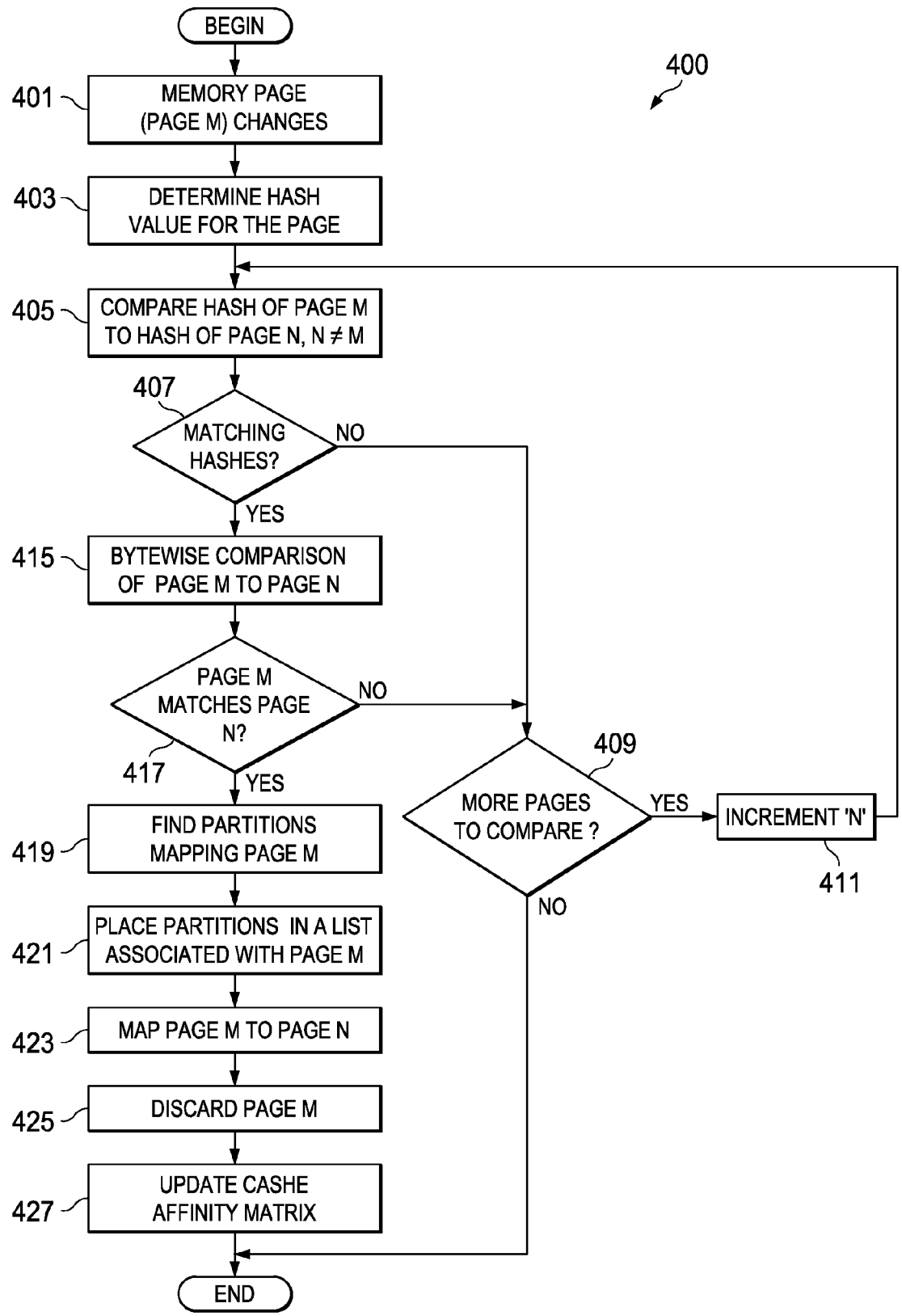

METHOD AND APPARATUS FOR VIRTUAL PROCESSOR DISPATCHING TO A PARTITION BASED ON SHARED MEMORY PAGES

BACKGROUND OF THE INVENTION

1. Field of the Invention

The present invention relates generally to a computer implemented method, data processing system, and computer program product for scheduling one or more threads to one or more physical processors among a pool of physical processors. More specifically, the present invention relates to assigning a virtual machine or partition to virtual processors in a cache efficient manner.

2. Description of the Related Art

Modern operating systems use a page-based virtual memory system where virtual memory is mapped to real memory in units of pages. The amount of available memory is finite, and the memory is subdivided into multiple individual pages of a pre-established size. Thus, a memory page is a unit of memory allocation used to virtualize physical memory.

Multiple core microprocessors host multiple physical processors. A physical processor is a collection of circuits that sequentially executes program instructions to manipulate data. A physical processor or core may include an arithmetic logic unit (ALU) as well as one or more registers. The design feature of multiple core microprocessors enables modern computers to process more data than single core microprocessors of a generation ago. Many multiple core microprocessors rely on a hypervisor to allocate resources to various running processes. A hypervisor is a software component that assigns virtual resources to available physical resources.

A physical microprocessor may contain multiple hardware threads of execution. A hardware thread may support the operation of a virtual machine. A hardware thread may support virtualization. A partition is an environment that executes upon virtual resources that have been abstracted from physical resources by a Hypervisor. A virtual machine simulates the hardware platform on which the partition runs. A partition may include the features of storage, system call interfaces, code interpreters, garbage collectors, and I/O ports, among other interfaces. A partition may also be described as a virtual machine. Each partition contains one or more virtual processors. The assignment of a virtual processor to a physical processor is called dispatching. Thus, a hypervisor dispatches a virtual processor of a partition to a physical processor.

Attendant with dispatching, the hypervisor selects available virtual processors from among several partitions that are referenced by a run queue. The time that a virtual processor waits in the run queue is the dispatch latency. A ready to run virtual processor is said to be runnable. A data processing system may apportion timeslices in arbitrary time units, but usually time segments of less than 10 milliseconds. During an interval where a first virtual processor finishes its allocated time slot and a second virtual processor begins its allocated time slot, the hypervisor performs a context switch. The virtual processors can be from different partitions. During the context switch, one or more hardware translation mechanisms keep each partition from directly accessing each other's memory. However, as the second virtual processor runs, it will naturally displace the contents in cache used by the first virtual processor.

Unfortunately, the reduced effectiveness of the cache due to context switching slows the rate of instructions through the microprocessor, as references for instructions and data now more frequently must be accessed from memory. In addition, where two virtual machines run distinct instances of a common operating system, the virtual machines will rely on identical code to perform their respective functions. Such identical code may be within the memory page, as allocated by the Hypervisor. Consequently, running virtual processors for different partitions that share common memory can reduce the amount of cache interference between partitions.

Unfortunately, prior art architectures cannot determine an extent to which a physical processor assignment will avail itself to reduced cache contention overhead. Moreover, the prior art architectures do not utilize knowledge of commonality of memory pages in cache to guide assignment of dispatching virtual processors to physical processors.

SUMMARY OF THE INVENTION

The present invention provides a computer implemented method, data processing system, and computer program product for mapping and dispatching virtual processors in a data processing system having at least a first partition and a second partition. The data processing system runs a first partition on a virtual processor during a first timeslice. The data processing system identifies an at least one physical page used by the first partition and the second partition. The data processing system maps the at least one physical page to the first partition and the second partition. The data processing system determines a fitness value based on the mapping. The data processing system dispatches the virtual processor to the second partition on a second timeslice based on the fitness value, wherein the second timeslice immediately succeeds after the first timeslice, whereby the at least one physical page remains in cache during at least the first timeslice and the second timeslice.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1B is a block diagram of a logically partitioned computer system having one or more logical partitions in accordance with an illustrative embodiment of the invention;

FIG. 4 is a flowchart of steps to revise cache reused affinity values in accordance with an illustrative embodiment of the invention.

DETAILED DESCRIPTION OF THE PREFERRED EMBODIMENT

Figure 1A:
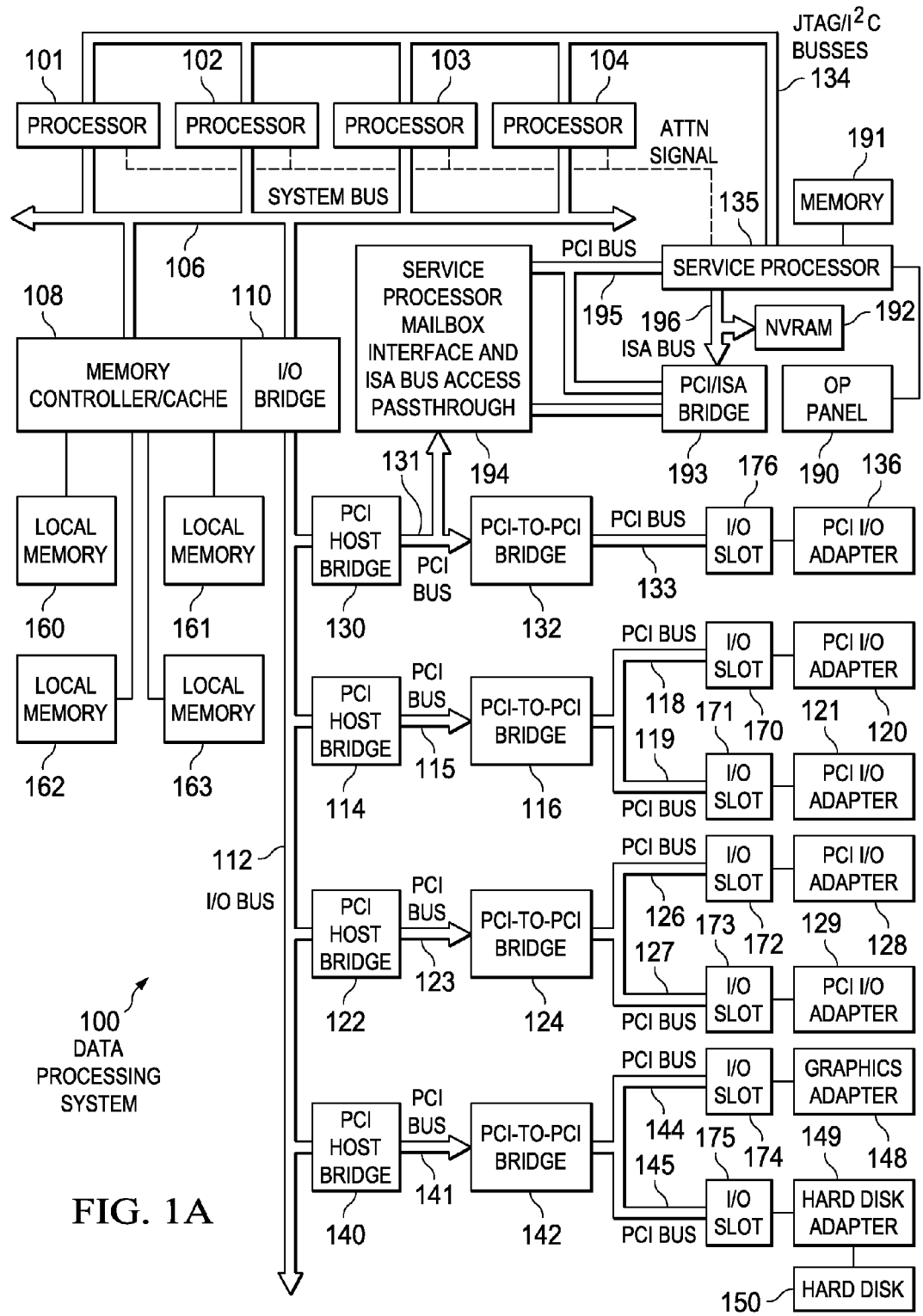
FIG. 1A shows a block diagram of a data processing system in which illustrative embodiments of the invention may be implemented.

FIG. 1A shows a block diagram of a data processing system in which illustrative embodiments of the invention may be implemented. Data processing system 100 may be a symmetric multiprocessor (SMP) system including a plurality of processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems or multiple instances of a single operating system running simultaneously. Each of these multiple operating systems may have any number of software programs executing within it. Data processing system 100 is logically partitioned such that different PCI I/O adapters 120,121, 128,129, and 136, graphics adapter 148, and hard disk adapter 149 may be assigned to different logical partitions. In this case, graphics adapter 148 connects a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, 136, graphics adapter 148, hard disk adapter 149, each of processors 101-104, and memory from local memories 160-163 is assigned to each of the three partitions. In these examples, local memories 160-163 may take the form of dual in-line memory modules (DIMMs). DIMMs are not normally assigned on a per DIMM basis to partitions. Instead, a partition will get a portion of the overall memory seen by the platform. For example, processors 102-103, some portion of memory from local memories 160-163, and PCI I/O adapters 121 and 136 may be assigned to logical partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. For example, one instance of the Advanced Interactive Executive (AIX®) operating system may be executing within partition P1, a second instance or image of the AIX® operating system may be executing within partition P2, and a Linux® operating system may be operating within logical partition P3. AIX® is a registered trademark of International Business Machines Corporation. Linux® is a registered trademark of Linus Torvalds.

Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters, that is, expansion slots for add-in connectors. Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192, also known as non-volatile RAM, connects to ISA bus 196. Service processor 135 connects to service processor mailbox interface and ISA bus access pass-through logic 194 through its local PCI bus 195. Service processor 135 also connects to processors 101-104 via a plurality of JTAG/I$^2$C busses 134. JTAG/I$^2$C busses 134 are a combination of JTAG/scan busses, as defined by Institute for Electrical and Electronics Engineers standard 1149.1, and Philips I$^2$C busses. However, alternatively, JTAG/I$^2$C busses 134 may be replaced by only Philips I$^2$C busses or only JTAG/scan busses. All SP-ATTN signals of the processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating processors 101-104, memory controller/cache 108, and I/O bridge 110. Any error information for failures detected during the BISTs, BATs, and memory tests are gathered and reported by service processor 135.

If a meaningful or valid configuration of system resources is still possible after taking out the elements found to be faulty during the BISTs, BATs, and memory tests, then data processing system 100 is allowed to proceed to load executable code into local memories 160-163. Service processor 135 then releases processors 101-104 for execution of the code loaded into local memory 160-163. While processors 101-104 are executing code from respective operating systems within data processing system 100, service processor 135 enters a mode of monitoring and reporting errors. The type of items monitored by service processor 135 includes, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and determine that this condition is predictive of a hard failure. Based on this determination, service processor 135 may mark that processor or other resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM eServer iSeries® Model 840 system available from International Business Machines Corporation. Such a system may support logical partitioning, wherein an OS/400® operating system may exist within a partition. iSeries® and OS/400® are registered trademarks of International Business Machines Corporation.

Those of ordinary skill in the art will appreciate that the hardware depicted in FIG. 1A may vary. For example, other peripheral devices, such as optical disk drives and the like, also may be used in addition to or in place of the hardware depicted. The depicted example does not imply architectural limitations with respect to embodiments of the present invention.

FIG. 1B shows a logically partitioned computer system 200 having one or more logical partitions 240 and 242. Partition manager 220 may generally control the creation and deletion of the logical partitions. Each logical partition may have an associated operating system, for example, operating system 212 and operating system 213 running on one or more virtual processors 214, 215. Concepts of virtual processors are described in detail in the commonly owned U.S. Pat. No. 6,957,435, entitled "Method and Apparatus for Allocating Processor Resources in a Logically Partitioned Computer System," which is herein incorporated by reference. Virtual processor 214 may be one among several virtual processors configured to support logical partition 240. Similarly, virtual processor 215 may be one among several virtual processors configured to support logical partition 242.

Computer system 200 may be any suitable type of computer system capable of supporting logical partitioning, such as a network server, mainframe computer, and the like. In one embodiment, the computer system is data processing system 100 of FIG. 1A. Computer system 200 generally includes one or more physical processors 230 and 231, coupled with memory 241. Physical processor 230 and physical processor 231 may be allocated among logical partition 240 and logical partition 242 according to any suitable allocation arrangement.

For example, each physical processor may be run as one or more of virtual processor 214 and virtual processor 215 of logical partition 240 and logical partition 242. The allocation of physical processors, memory, as well as various other resources, such as I/O devices 252 among the logical partitions may be controlled by partition manager 220.

As illustrated, the computer system 200 may include interrupt controller 250 configured to receive interrupts generated by I/O devices 252, and route the interrupts to one or more of physical processors 230, 231, as designated by global interrupt queue 256. Partition manager 220 may include virtual interrupt management mechanism 224 generally configured to receive interrupts from physical processors 230, 231 and route the interrupts to virtual processors 214, 215. Such a mechanism may receive interrupts, for example, as a result of I/O interrupts presented via global interrupt queue (GIQ) 256.

Virtual interrupt management mechanism 224 may determine which among logical partitions 240, 242 is targeted by the interrupt. Thus, the virtual interrupt management mechanism may hide such details from physical processors 230, 231. For example, the virtual interrupt management mechanism 224 may determine which logical partition 240, 242 is targeted by the interrupt based on the interrupt source. The interrupt source may be identified in interrupt register 236 or interrupt register 237 of physical processors 230, 231. In order to process the interrupt, a virtual interrupt may be presented to one of the virtual processor 214, 215 running on the targeted logical partition, for example, logical partition 240. Virtual interrupt management mechanism 224 may also generate virtual interrupts in response to events occurring oil one or more virtual devices 218, 219.

In either case, virtual processors 214, 215 available for presentation of the virtual interrupt may be designated by virtual global interrupt queue 226 associated with the targeted logical partition 240. Logical partition 240 may be running virtual processors 214, 215 that are not assigned to virtual global interrupt queue 226. Consequently, such virtual processors 214, 215 will not receive virtual interrupts via virtual global interrupt queue 226. However, such virtual processors 214, 215 may still receive virtual interrupts specifically targeting them. In addition to the architecture of FIG. 1B, it is appreciated that alternate embodiments may associate exclusively each logical partition with a virtual global interrupt queue. Depending on the implementation, each virtual global interrupt queue 226 may virtualize a hardware global interrupt queue dedicated to a corresponding logical partition 240, 242 or virtual global interrupt queues may collectively virtualize a hardware global interrupt queue shared among multiple logical partitions 240, 242.

In either case, virtual global interrupt queue 226 may be configured to determine which of its associated virtual processors 214, 215 is best suited to process the virtual interrupt based on their respective operating states. In making the determination, virtual global interrupt queue 226 may examine the operating states of associated virtual processors 214, 215 in order to establish whether one or more criteria favorable to processing a virtual interrupt have been satisfied. A variety of different operating state criteria may be applied to determine which virtual processor 214, 215 is best suited to process a virtual interrupt, the particular details of which may vary with different embodiments.

The aspects of the illustrative embodiments recognize that moving data in and out of cache as a long term consequence of a context switch can be reduced through the wise allocation of partitions to physical processors. For example, physical processors that share a common cache avoid costly context switch overhead when a memory page is unchanged between dispatch cycles of the physical processors. One or more embodiments may optimize based on an amount of data sharing between virtual processors. This optimization is directed to partitions, and improves performance for those partitions that share physical pages. The technique tracks pages between partitions to identify best-case cache reused affinity between virtual processors on physical processor cache topologies. One or more illustrative embodiments may improve the overall system processor efficiency due to better usage of physical caches.

Figure 2A:
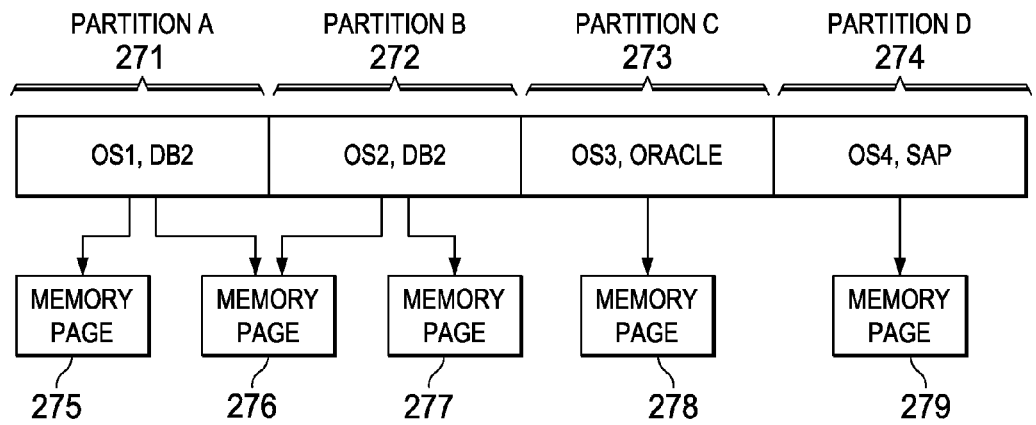
FIG. 2A shows a set of partitions and corresponding references to memory pages in accordance with an illustrative embodiment of the invention.

FIG. 2A shows a set of partitions and corresponding references to memory pages in accordance with an illustrative embodiment of the invention. The partitions include partition A 271, partition B 272 partition C 273, and partition D 274. Partition A 271, partition B 272 partition C 273, and partition D 274 reference and process data in memory page 275, memory page 277, memory page 278, and memory page 279, respectively. In addition, partition A 271 and partition B 272 reference memory page 276, and thus share that memory page. Partitions 271-274 may be, for example, partitions 240, 242 of FIG. 1B. Memory pages 275-279 may be located within caches (not shown) of processors 230-231 of FIG. 1B. When two partitions or virtual machines are executing instances of a common code, those partitions can share memory pages. For example, partition A 271 and partition B 272 each operate the application DB2. Consequently, memory page 276 is shared between partition A 271 and partition B 272. Memory page 276 may be comprised of machine instructions for the DB2 application. It is appreciated that other forms of data may be resident within shared memory pages. For example, common operating system code, or static data, may also form the basis for sharing a page between partitions.

Figure 2B:
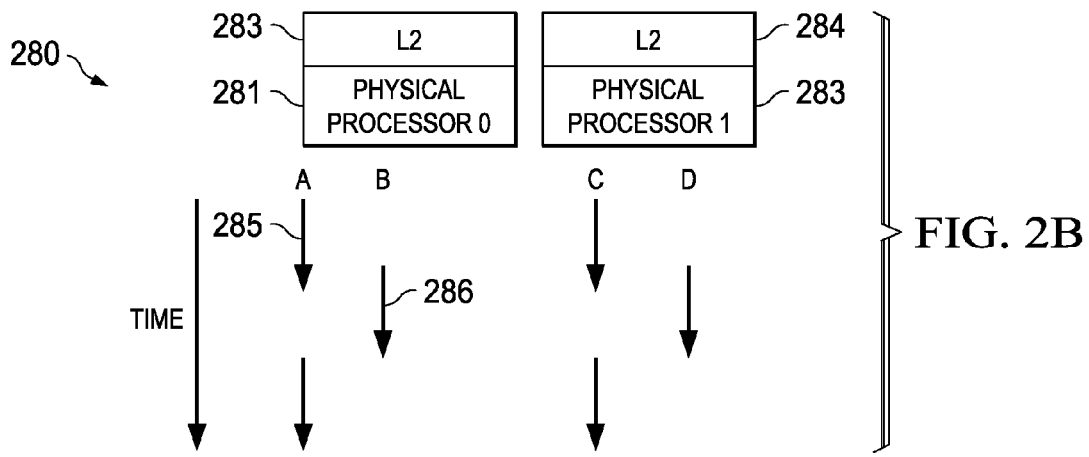
FIG. 2B shows an exemplary data processing architecture wherein each physical processor has a distinct L2 cache in accordance with an illustrative embodiment of the invention.

FIG. 2B shows an exemplary data processing architecture wherein each physical processor has a distinct L2 cache in accordance with an illustrative embodiment of the invention. A cache is a memory that is accessible to a processor at a higher speed than a backing store. A backing store is a lower speed data storage than the cache. Caches can exist in a hierarchical fashion. Moreover, the cache can be used to retain copies of data from the backing store such that such data may be more readily accessed than if the data was available in the backing store alone. Level 1 or L1 cache may be the fastest cache in a computer architecture. Such a cache may provide for accelerated access to a backing store such as level 2 or L2 cache. The L1 and L2 caches typically are manufactured on a common semiconductor die with one or more core or physical processors.

Non-shared cache architecture 280 includes physical processor 0 281 and physical processor 1 282. Physical processor 0 281 uses L2 cache 283, while physical processor 1 282 uses L2 cache 284. A partition assignment scheme that avoids some costly context switching operations may assign partition A to a timeslice 285 and partition B to a timeslice 286 that succeeds immediately after timeslice 285. By "immediately," it is meant that there is no intervening assignment of partitions to physical or virtual processors between the earlier timeslice and the later timeslice. A start of a timeslice is a time when a virtual processor prepares for and begins processing tasks associated with a partition. Such a time may occur many times during the operation of a data processing system, for example, at times when a partition is assigned a second or later use of a virtual processor. During the interval that a hypervisor dispatches partition B, the data processing system suppresses unloading page 276 of FIG. 2A since the page will be used during timeslice 286. A timeslice is an interval during which a virtual processor is dispatched to run the tasks of the partition.

Figure 2C:
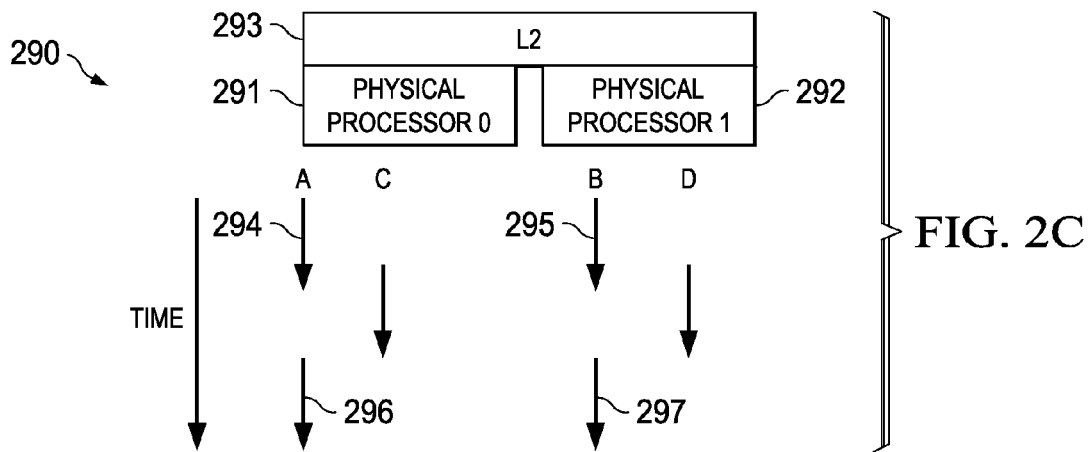
FIG. 2C shows an exemplary data processing architecture where each physical processor has a shared L2 cache in accordance with an illustrative embodiment of the invention.

FIG. 2C shows an exemplary data processing architecture where each virtual processor has a shared L2 cache in accordance with an illustrative embodiment of the invention. Shared cache architecture 290 includes physical processor 0 291 and physical processor 1 292. The processors share L2 cache 293. A first partition assignment may accomplish greater value from the L2 cache if the first partition is assigned a virtual processor to a physical processor that shares the cache with a second partition that uses common memory pages as the first partition. Such an arrangement comprises assigning a virtual processor of partition A 294 to physical processor 0 291 contemporaneously with a virtual processor of partition B 295 being assigned to physical processor 1 292. Similarly, following an interval of waiting, of virtual processor of partition A may be assigned time 296 on physical processor 0 291 at second time 296 and common time 297 with partition B assigned to physical processor 1 292.

Figures 3A, 3B:
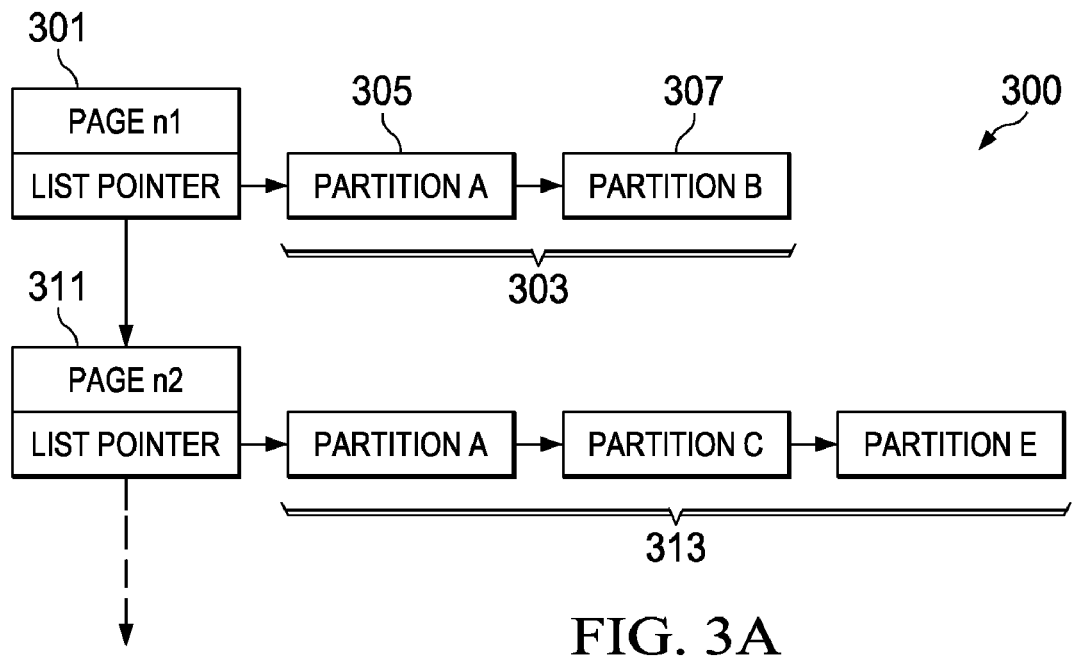
FIG. 3A shows a data structure for tracking partitions that share a common memory page in accordance with an illustrative embodiment of the invention.
FIG. 3B is a data structure of cache reused affinity values in accordance with an illustrative embodiment of the invention.

FIG. 3A shows a data structure for tracking partitions that share a common memory page in accordance with an illustrative embodiment of the invention. Data structure 300 may be a linked list with a memory page and a head to a linked list within each element of the linked list. The head to the linked list points to an additional linked list comprised of elements made up of virtual machine or partition references. A pointer may point to a list of shared memory pages including, for example, page n1 301 and page n2 311. Page n1 301 may point to list 303 including reference to partition A 305 and reference to partition B 307. In this example, page n1 301 is shared by two partitions: partition A and partition B.

Similarly, page n2 311 points to list 313. List 313 includes three partitions: partition A, partition C and partition E. As a hypervisor detects sharing of memory pages between partitions, the hypervisor may attach additional partition references to the applicable list. In addition, as a partition ceases to share a memory page with other partitions, the partition may truncate or remove the partition reference from the applicable list.

FIG. 3B is a data structure of cache reused affinity values in accordance with an illustrative embodiment of the invention. The illustrative embodiment uses array or cache affinity matrix 370 to store cache reused affinity values. A cache reused affinity value is the number of memory pages shared by two partitions. Thus, each cache reused affinity value is associated with or referenced by two partitions. For example, partition A and partition B may have 60 memory pages in common. Consequently, the hypervisor may store 60 as the cache reused affinity value in array element 371. Array element 371 is referenced by partition A and partition B. The cache reused affinity value in array element 371 exceeds the cache reused affinity values in array element 373 or array element 375.

Adding a further partition to a list of partitions that share a memory page may result in increasing the cache reused affinity values associated with that page. For example, adding partition E as a sharer to memory page 311 of FIG. 3A can result in boosting the array elements under the partition E column of FIG. 3B accordingly.

FIG. 4 is a flowchart of steps to revise cache reused affinity values in accordance with an illustrative embodiment of the invention. Unless otherwise noted, with respect to FIG. 4, a page is the physical page that may serve as a backing store to a page stored in cache. The steps of FIG. 4 can be thought of as occurring in two phases. An initial phase is one or more steps that identify at least one physical page used by the first partition and the second partition. A second phase is one or more steps that map the page or pages to a first partition, a second partition, and additional partitions, if any. These phases are explained further below.

A physical page is a block of memory that is randomly accessed, for example, from RAM. A hypervisor may perform the steps of flowchart 400. Initially, a hypervisor performs steps of the first phase. The hypervisor may detect that a memory page changes (step 401). The memory page is known as "page M." The hypervisor may be, for example, partition manager 220 of FIG. 1B. Next, the hypervisor determines a hash value for the memory page (step 403). A hash value is a number or string that may uniquely identify contents of a memory page. The hash value is a smaller unit of data than the contents of the memory page. In addition, a hash value can refer to multiple memory pages if either a) the memory pages are identical or; b) a hash collision occurs. The hypervisor may also store the hash value within an array or other data structure. Next, the hypervisor compares the hash value with a second hash value associated with "page N," a memory page different than page M (step 405). The hypervisor determines if the hash values match (step 407).

If the hash values do not match, the hypervisor determines if there are more pages to compare (step 409). If there are no more pages to compare at step 409, the hypervisor terminates processing. However, if there are more pages to compare, the hypervisor increments the index to a next memory page (step 411). To the extent that the next memory page is not page M, the hypervisor performs step 405.

Responsive to a positive result at step 407, the hypervisor makes a bytewise comparison of page M to page N (step 415). By using hash values, the hypervisor can quickly discount matches of the underlying data between memory pages. A matched hash value is a condition where two hashes are identical to each other. A bytewise comparison is a comparison of each byte in one page to a corresponding byte in the second page. It is appreciated that a byte may be any arbitrarily selected length established at the configuration of the data processing system.

Next, the hypervisor determines if the comparison results in page M matching page N (step 417). If the result of step 417 is negative, the hypervisor continues at step 409. However, if all the bytes match, the hypervisor finds partitions that map to page M (step 419). A positive outcome to step 417 means that the hypervisor has found a match between a first memory page in a cache and a second memory page in the cache. A match is a condition where the two data structures, in this case memory pages, are identical. Matching the memory pages byte-for-byte may discount the possibility that the hash values matched in step 417 did so because of a hash collision. The Hypervisor then maps the virtual addresses to a common physical page address, sharing this data directly between partitions. A virtual address is a reference that can be translated to a physical page. The virtual address corresponds to only one physical page. If the virtual address is changed to reference a second physical page, any prior reference is broken. The physical page may be either in cache memory or in a backing store for the cache memory. The data processing system may perform this sharing arrangement by using a copy-on-write mechanism to respond when one partition attempts to modify the page. Next, the hypervisor places the partitions found in step 419 into a list associated with page M (step 421). Next, the hypervisor maps page M to page N (step 423). By mapping page M to page N, the data processing system forms a virtual address mapped to a physical page such that there are at least two virtual addresses mapped to the same physical page. Any page the virtual address formerly mapped becomes dereferenced, as far as the virtual address is concerned, in the process. Collectively, the steps 401 through 423 are the first phase.

Processing continues in a second phase. The at least one physical page is mapped to the first partition and the second partition, and optionally, additional partitions. Attendant with this phase, the hypervisor discards page M (step 425). In other words, the hypervisor may remove the redundant copy of the page from the cache. Next, the hypervisor updates the cache affinity matrix accordingly (step 427). In other words, the hypervisor may determine a number of physical pages mapped to the first partition and the second partition, and place the number in a matrix cell associated with each of the first partition and the second partition. The cell may be in a data structure, such as, for example, an array, a table, linked list, or other data structure. Processing terminates thereafter.

The following describes at least two illustrative embodiments of the invention. Each embodiment may be configured to achieve a different goal. For example, one goal may be to improve overall throughput of all physical processors as compared to the prior art. Another goal can be to reduce volatility of a single partition's performance at the expense of the collective performance of all partitions as compared to the prior art. The choice of a type of fitness value, explained below, determines which goal may drive improvement in the performance of a data processing system.

Figure 5:
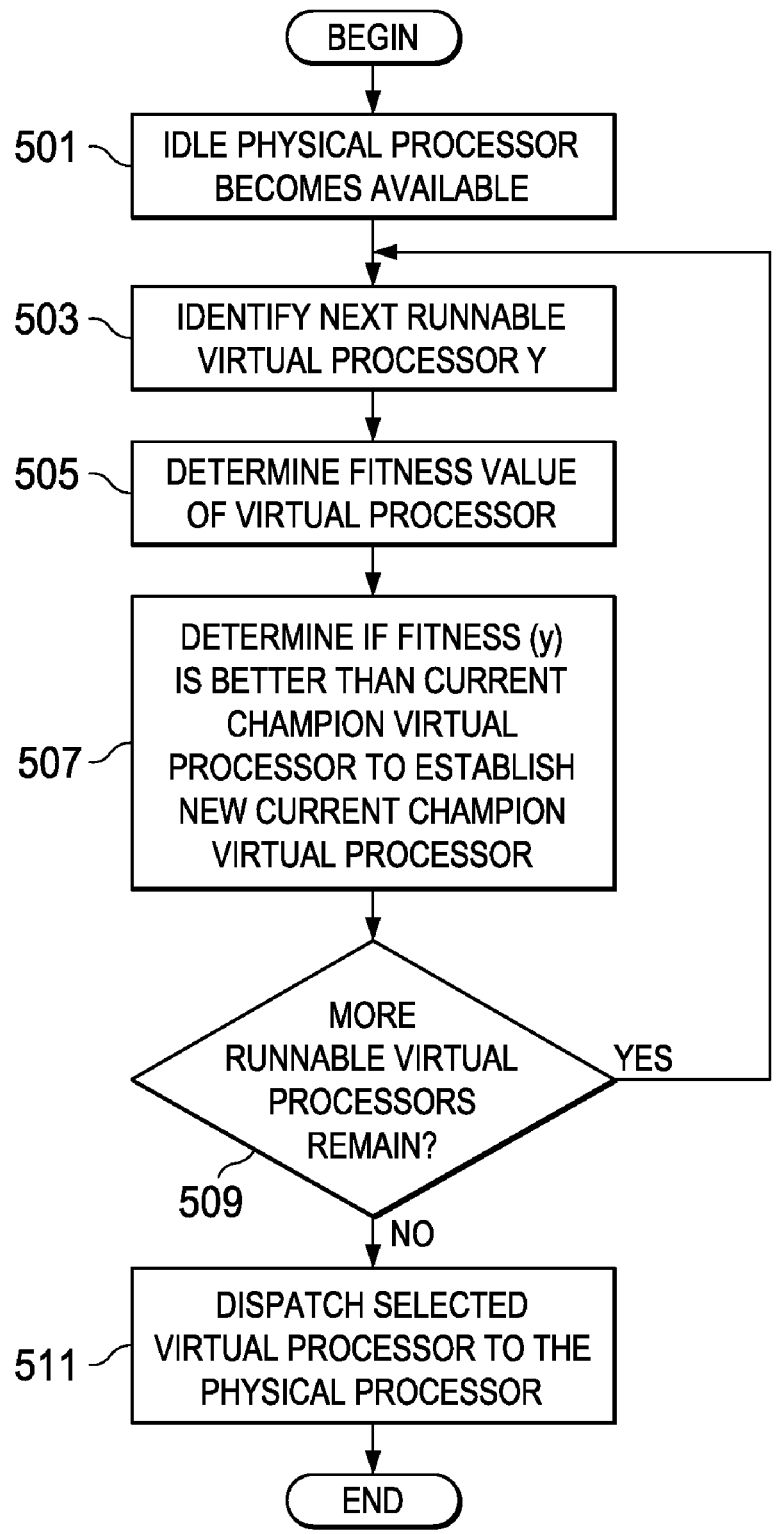
FIG. 5 is a flowchart of steps to dispatch a virtual processor in accordance with an illustrative embodiment of the invention.

FIG. 5 is a flowchart of steps to dispatch a virtual processor in accordance with an illustrative embodiment of the invention. A hypervisor may perform the steps of the flowchart in order to dispatch partitions to physical processors having the architecture of FIG. 2B. Initially, an idle physical processor becomes available (step 501). An idle physical processor is a physical processor that executes no instructions on behalf of a partition. Such a situation may arise when a hypervisor is waiting or looking for virtual processors to run. The hypervisor identifies the next runnable virtual processor, virtual processor Y (step 503). A runnable virtual processor is a virtual processor that is referenced in a run queue. The hypervisor performs step 503 by identifying each runnable virtual processor from a set of runnable virtual processors. The set of runnable virtual processors is the set of virtual processors that are not dispatched concurrent with performing step 503 and that are currently entitled to run. A dispatch cycle is a period of time that a hypervisor schedules a virtual processor to run on a physical processor. Thereby, the virtual processor supports the functions of one or more virtual machines. An operator of the data processing system may establish a dispatch cycle of sufficient duration to allow for further subdivisions or timeslices within the dispatch cycle. The timeslices may be allocated on a proportional basis among multiple partitions.

Next, the hypervisor determines a fitness value for the virtual processor (step 505). A fitness value is a value used to rank pairings of partitions for achieving a goal concerning physical processor utilization of the partition over time. For example, in one embodiment, the hypervisor calculates the fitness value based on the cache reused affinity value referenced by a partition that includes virtual processor Y and a partition that includes virtual processor X. Thus, for example, the fitness value may be the cache reused affinity value itself. A virtual processor becomes associated with the affinity value of the partition to which the virtual processor belongs. This assignment is a persistent assignment. Consequently, the indirect association of the partition's cache reused affinity value to the virtual processor may be used as a fitness value in determining which among the physical processors to assign the virtual processor during the dispatch operation. Next, the hypervisor determines if the fitness of virtual processor Y is better than a current champion virtual processor to establish a new current champion virtual processor (step 507). A current champion virtual processor is the virtual processor that has a fitness value that exceeds or equals a fitness value of a virtual processor found in step 505. In other words, the hypervisor, upon entering a loop of steps at step 503, establishes the first virtual processor, indexed by Y, as the default champion virtual processor. Subsequent hypervisor execution of step 507 causes the hypervisor to replace the champion virtual processor with increasingly better virtual processors or at least virtual processors having as good a fitness value as had been assigned a replaced champion virtual processor. Next, the hypervisor determines if more runnable virtual processors remain (step 509). If so, then the hypervisor performs step 503 but with an index to refer to a next virtual processor.

It is appreciated that the fitness value may take into account other matters by weighing factors other than cache reused affinity values. For example, one factor can be selecting a virtual based on memory affinity with a particular physical processor. Another factor can be dispatching a virtual processor based on a time entitlement of the partition. Still another factor can be cache affinity, the scheduling of a virtual processor or other process on a processor where it ran most recently. Consequently, the value assigned to the fitness value may depend on one or more additional factors.

If step 509 indicates that the runnable virtual processors have been all tested against the champion virtual processor, the champion virtual processor becomes a selected runnable virtual processor. A virtual processor is a dispatchable entity of a partition. A hypervisor handles the apportionment of time of a core to form each virtual processor. The number of virtual processors in a data processing system tends to remain uniform for a given set of hardware. A selected runnable virtual processor is a virtual processor that has a highest fitness value during the interval of assigning a virtual processor to run on the physical processor. Thus, the hypervisor dispatches the selected runnable virtual processor to the physical processor (step 511).

If the hypervisor is operating in a non-shared cache architecture, for example, non-shared cache architecture 280 of FIG. 3B, the hypervisor also dispatches or assigns a partition to run on the virtual processor during step 511. In this example, the partition, for example, partition 286 of FIG. 3B is assigned a virtual processor that is the virtual processor supporting partition 285 in a prior timeslice.

If the hypervisor is operating in a shared cache architecture, for example shared cache architecture 290 of FIG. 3C, the hypervisor dispatches or assigns a partition to run on a second virtual processor during step 511, wherein the second virtual processor remains assigned to partition X.

An alternative embodiment may calculate a fitness value for a virtual processor at step 505. In order to achieve greater uniformity of performance among partitions operating on a data processing system, the virtual processor may be selected regardless of cache, memory, or memory sharing affinity. Consequently, the alternative embodiment may set the fitness value to be a pseudorandom number generated by a pseudorandom number generator.

The illustrative embodiments permit an operation of virtual processors to reduce overhead associated with cache contention by seeking to maximize sharing of memory pages in cache.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for dispatching virtual processors in a data processing system having at least a first partition and a second partition, the method comprising:
running the first partition on a first virtual processor during a first timeslice;
identifying an at least one physical page used by the first partition and the second partition;
mapping the at least one physical page to the first partition and the second partition;
determining a fitness value based on the mapping; and
dispatching the first virtual processor to the second partition on a second timeslice based on the fitness value, wherein the second timeslice immediately succeeds after the first timeslice, whereby the at least one physical page remains in cache during at least the first timeslice and the second timeslice.

2. The computer implemented method of claim 1, wherein the fitness value is proportional to a number of physical pages mapped to the first partition and the second partition.

3. The computer implemented method of claim 2, wherein the mapping step further comprises:

matching a first physical page and a second physical page based on a hash value assigned to the first physical page, the hash value assigned to the second physical page, and a bytewise match of the first physical page and the second physical page, wherein the first physical page and the second physical page are among the at least one physical page; and mapping a first virtual address corresponding to the first physical page to form a virtual address mapped to the second physical page, wherein at least one second virtual address maps to the second physical page.

4. The computer implemented method of claim 3, wherein the fitness value is a cache reused affinity value that relates a number of shared pages between the first virtual processor and the second virtual processor.

5. The computer implemented method of claim 4, wherein the first virtual processor and the second virtual processor are part of the data processing system, and the first virtual processor does not share a cache with the second virtual processor.

6. The computer implemented method of claim 1, the first virtual processor shares a cache with a second virtual processor.

7. The computer implemented method of claim 1, wherein the fitness value is a pseudorandom number.

8. A computer program product comprising:
a computer-readable tangible storage device having computer usable program code for dispatching virtual processors in a data processing system having at least a first partition and a second partition, said computer program product comprising:
computer usable program code for running the first partition on a first virtual processor during a first timeslice;
computer usable program code for identifying an at least one physical page used by the first partition and the second partition;
computer usable program code for mapping the at least one physical page to the first partition and the second partition;
computer usable program code for determining a fitness value based on the mapping; and
computer usable program code for dispatching the first virtual processor to the second partition on a second timeslice based on the fitness value, wherein the second timeslice immediately succeeds after the first timeslice, whereby the at least one physical page remains in cache during at least the first timeslice and the second timeslice.

9. The computer program product of claim 8, wherein the fitness value is proportional to a number of physical pages mapped to the first partition and the second partition.

10. The computer program product of claim 9, wherein the computer usable program code for mapping further comprises:
computer usable program code for matching a first physical page and a second physical page based on a hash value assigned to the first physical page, the hash value assigned to the second physical page, and a bytewise match of the first physical page and the second physical page, wherein the first physical page and the second physical page are among the at least one physical page; and
computer usable program code for mapping a first virtual address corresponding to the first physical page to form a virtual address mapped to the second physical page, wherein at least one second virtual address maps to the second physical page.

11. The computer program product of claim 10, wherein the first virtual processor does not share a cache with a second virtual processor and the fitness value is a cache reused affinity value that relates a number of shared pages between the first virtual processor and the second virtual processor.

12. The computer program product of claim 8, wherein the first virtual processor and the second virtual processor are part of the data processing system, and the first virtual processor does not share a cache with the second virtual processor.

13. The computer program product of claim 8, wherein the fitness value is a pseudorandom number.

14. A data processing system comprising:
a bus;
a storage device connected to the bus, wherein computer usable code is located in the storage device;
a communication unit connected to the bus;
a processing unit connected to the bus, wherein the processing unit executes the computer usable code for dispatching virtual processors in the data processing system having at least a first partition and a second partition, wherein the processing unit executes the computer usable code to run the first partition on a first virtual processor during a first timeslice; identify an at least one physical page used by the first partition and the second partition; map the at least one physical page to the first partition and the second partition; determine a fitness value based on the mapping; and dispatch the first virtual processor to the second partition on a second timeslice based on the fitness value, wherein the second timeslice immediately succeeds after the first timeslice, whereby the at least one physical page remains in cache during at least the first timeslice and the second timeslice.

15. The data processing system of claim 14, wherein the fitness value is proportional to a number of physical pages mapped to the first partition and the second partition.

16. The data processing system of claim 15, wherein in executing computer usable code to map, the processing unit executes computer usable code to match a first physical page and a second physical page based on a hash value assigned to the first physical page, the hash value assigned to the second physical page, and a bytewise match of the first physical page and the second physical page, wherein the first physical page and the second physical page are among the at least one physical page; and map a first virtual address corresponding to the first physical page to form a virtual address mapped to the second physical page, wherein at least one second virtual address maps to the second physical page.

17. The data processing system of claim 16, wherein the fitness value is a cache reused affinity value that relates a number of shared pages between the first virtual processor and the second virtual processor.

18. The data processing system of claim 17, wherein the first virtual processor and the second virtual processor are part of the data processing system, and the first virtual processor does not share a cache with the second virtual processor.

19. The data processing system of claim 14, wherein the first virtual processor shares a cache with a second virtual processor.

20. The data processing system of claim 14, wherein the fitness value is a pseudorandom number.

* * * * *